(12) United States Patent
Markowitz et al.

(10) Patent No.: US 8,555,661 B2
(45) Date of Patent: Oct. 15, 2013

(54) AIR CONDITIONING SYSTEM FOR A MOTOR VEHICLE AND METHOD FOR ITS OPERATION

(75) Inventors: Markus Markowitz, Cologne (DE); Dietmar Fischer, Cologne (DE)

(73) Assignee: Ford Global Technologies, L.L.C., Dearborn, MI (US)

( * ) Notice: Subject to any disclaimer, the term of this patent is extended or adjusted under 35 U.S.C. 154(b) by 855 days.

(21) Appl. No.: 12/179,317

(22) Filed: Jul. 24, 2008

(65) Prior Publication Data

US 2009/0049848 A1 Feb. 26, 2009

(30) Foreign Application Priority Data

Jul. 26, 2007 (DE) .......................... 10 2007 034 821

(51) Int. Cl.
*G01K 13/00* (2006.01)
*F25B 49/00* (2006.01)
*F25B 45/00* (2006.01)

(52) U.S. Cl.
USPC .................................. 62/129; 62/126; 62/149

(58) Field of Classification Search
USPC ........... 62/149, 136, 114, 183, 184, 511, 527, 62/129, 126
See application file for complete search history.

(56) References Cited

U.S. PATENT DOCUMENTS

| | | | |
|---|---|---|---|
| 4,745,767 A * | 5/1988 | Ohya et al. ....................... | 62/211 |
| 5,231,842 A | 8/1993 | Manz et al. | |
| 5,289,692 A * | 3/1994 | Campbell et al. ................ | 62/181 |
| 5,335,507 A * | 8/1994 | Powell ............................. | 62/129 |
| 6,318,097 B1 | 11/2001 | Wieszt | |
| 2003/0057396 A1 | 3/2003 | Cawley | |
| 2005/0092002 A1* | 5/2005 | Wightman ....................... | 62/222 |
| 2006/0080976 A1 | 4/2006 | Markowitz et al. | |
| 2007/0294005 A1 | 12/2007 | Kerschl | |

FOREIGN PATENT DOCUMENTS

| | | |
|---|---|---|
| DE | 60107782 | 6/2005 |
| DE | 2004002174 B4 | 11/2005 |
| EP | 1650067 A1 * | 4/2006 |

OTHER PUBLICATIONS

English translation (espacenet.com) of Abstract of German Patent No. DE2004002174B4, (Aug. 11, 2005).
English translation (espacenet.com) of German Patent No. DE60107782, (Jun. 9, 2005).

* cited by examiner

*Primary Examiner* — Chen Wen Jiang
(74) *Attorney, Agent, or Firm* — Tung & Associates; Raymond I. Coppielle

(57) ABSTRACT

In an air-conditioning system for a motor vehicle, having a coolant circuit formed from a compressor for compressing the coolant, a condenser for cooling the compressed coolant, an expansion device for reducing the pressure of the coolant and an evaporator for evaporating the coolant, a control unit is provided which is connected to at least one of the coolant circuit components and which is set up to adapt an operating characteristic of the component to at least two different coolants.

17 Claims, 3 Drawing Sheets

AIR CONDITIONING SYSTEM FOR A MOTOR VEHICLE AND METHOD FOR ITS OPERATION

CROSS REFERENCE TO RELATED APPLICATIONS

This application claims benefit of German Application Serial No. DE 102007034821.7, filed Jul. 26, 2007.

FEDERALLY SPONSORED RESEARCH OR DEVELOPMENT

Not applicable.

REFERENCE TO SEQUENCE LISTING

Not applicable.

BACKGROUND OF THE INVENTION

1. Field of the Invention

The invention relates to an air-conditioning system for a motor vehicle having a coolant circuit formed at least from a compressor for compressing the coolant, a condenser for cooling the compressed coolant, an expansion device for reducing the pressure of the coolant and an evaporator for evaporating the coolant, and to a method for operating an air-conditioning system.

2. Description of Related Art

European Patent No. EP 1 647 428 A1 discloses an air-conditioning system having a coolant circuit. The air-conditioning system permits the provision of a cooling medium with a low temperature, where a cooling medium is supplied to a heat exchanger and is used there for cooling ambient air or cabin air, which has a higher temperature. The cooled air is subsequently supplied to an interior space of the motor vehicle in order to permit cooling there, in particular temperature control to a predefinable target temperature.

At present, use is widely made of the fluorinated hydrocarbon 1,1,1,2-tetrafluoroethane as the coolant for the coolant circuit under the designation R134a, which, in contrast to the previously used chlorofluorocarbons (CFCs), do not damage the ozone layer in the earth's atmosphere.

BRIEF SUMMARY OF THE INVENTION

The object of the invention is that of creating an air-conditioning system which can be adapted in a simple manner to different national legal regulations.

Said object is achieved by means of an air-conditioning system having the features of claim 1 and by a method having the features of claim 13. Advantageous refinements of the invention are the subject matter of the subclaims.

By means of the control unit according to the invention, which is connected to at least one of the coolant circuit components and which is set up to adapt an operating characteristic of the component to at least two different coolants, it is possible for the air-conditioning system to be operated with at least two different coolants, without it being necessary to make fundamental changes to the coolant circuit or to the control unit when filling the coolant circuit with one or the other coolant. The coolants can be pure substances or mixtures, in particular of a plurality of different coolants.

The at least two different coolants for which the control unit is set up preferably have similar characteristic values such as density, heat transfer properties, viscosity and heat capacity.

In another advantageous embodiment of the invention, the control unit is set up to be programmable and can, after filling with a coolant, be programmed with the coolant-specific characteristic curves, characteristic maps or calculation algorithms.

The expansion device in the coolant circuit is advantageously embodied as a capillary tube ("orifice") since a capillary tube of said type permits the use of a wide range of coolants without it being necessary to carry out changes to the capillary tube for the different coolants.

In one embodiment of the invention, it is provided that the control unit is connected to the compressor and is set up to influence a compressor pressure and/or a compressor power in a coolant-dependent fashion. The compressor pressure refers to the maximum pressure which can be obtained by compressing the coolant in the compressor. Since the different coolants can also be compressed with varying degrees of difficulty, and different pressure differences must be obtained in the expansion device for said different coolants in order to obtain a substantially identical cooling power for the air-conditioning system, it is possible with an adjustable compressor to predefine the compressor pressure, in particular by adjusting the compressor stroke. It is alternatively or additionally possible for the power provided at the compressor to be controlled or regulated by the control device either by carrying out throttling of the power which is to be provided or by virtue of the compressor being operated only intermittently, that is to say having an activation duration of less than 100%. If the compressor is driven by an internal combustion engine of a motor vehicle, it is possible for a controllable clutch to be provided between the internal combustion engine and the compressor, where the clutch can be influenced by the control unit in order to bring about a power reduction by means of slip or a deactivation of the power supply by means of decoupling.

In a further embodiment of the invention, it is provided that a temperature sensor which is connected to the control unit is provided on the evaporator, and that the control unit is set up to influence the compressor pressure and/or the compressor power as a function of the coolant and as a function of a temperature signal of the temperature sensor. By means of the temperature sensor which is attached to the evaporator, it is possible, in the event of the evaporator temperature being too low, which could lead to the evaporator icing-up, for the control unit to carry out a power reduction or deactivation of the compressor so that temporarily no coolant is expanded in the evaporator. In this way, the evaporator can, by means of ambient air or cabin air of the motor vehicle, be brought back to a temperature at which icing-up can be eliminated. The compressor pressure and/or the compressor power are influenced differently as a function of the coolant used and as a function of the measured temperature of the evaporator.

In a further embodiment of the invention, it is provided that a pressure sensor is attached to the compressor, and that the control unit is set up to influence the compressor pressure and/or the compressor power as a function of the coolant and as a function of a pressure signal of the pressure sensor. The pressure signal determined by the pressure sensor makes it possible for the control unit, with the knowledge of the coolant used, to draw conclusions regarding the temperature at the evaporator, and possibly to carry out a power reduction or a pressure reduction at the compressor if icing-up of the evaporator is imminent. The pressure sensor can be assigned to the suction side or the pressure side of the compressor.

In a further embodiment of the invention, it is provided that the control unit is connected to a cooling device which is attached to the condenser, and said control unit is set up to activate the cooling device as a function of the coolant or as a function of the coolant and of a temperature at the evaporator and/or of a pressure at the compressor. The condenser is a heat exchanger in which the coolant which is heated by the compressor as a result of the compression flows and around which ambient air flows in order to bring about cooling of the coolant. In order to increase the efficiency of the condenser, the ambient air is directed toward the condenser by means of a cooling device embodied as a fan. In this way, it is possible for more heat to be dissipated from the condenser, as a result of which the coolant has a lower temperature as it flows out of the condenser and can therefore impart a greater cooling power. The cooling device is activated as a function of the coolant used, if appropriate taking into consideration the temperature of the evaporator and/or the pressure at the compressor, in order to be able to bring about sufficient additional cooling for the coolant in the condenser.

In a further embodiment of the invention, it is provided that the expansion device has an exchangeable capillary tube which is adapted to the coolant. The capillary tube in the expansion device is also referred to as an "orifice" and is a nozzle or throttle aperture which limits a volume flow of the coolant and therefore ensures that a high pressure prevails in the coolant circuit between the outlet side of the compressor and the capillary tube, while a lower pressure prevails between the capillary tube and the inlet side of the compressor. As a result of the throttling action of the capillary tube and the pressure reduction for the coolant which is brought about in this way, and also as a result of the provision of heat at the evaporator, the coolant is evaporated and therefore extracts a predefinable quantity of heat from the ambient air or from the cabin air which flows around the evaporator. In this way, the ambient air or cabin air is cooled, and the coolant flows out, substantially in the gaseous state of aggregation, in the direction of the inlet side of the compressor. The throttling properties of the capillary tube are determined substantially by its inner diameter and by its length, which can be expressed in combination as a normalized effective cross section. The demands on the effective cross section can vary between the different coolants, so that an adaptation of the coolant circuit to different coolants can be carried out by exchanging the simply-constructed capillary tube.

In a further embodiment of the invention, it is provided that the control unit has at least two different characteristic curves or characteristic maps or calculation algorithms for an activation of the compressor and/or of a fan for the condenser as a function of the coolant and/or of a pressure at the compressor and/or of a temperature at the evaporator. A characteristic curve is a two-dimensional representation of a relationship between a first parameter, for example a power output at the compressor or an activation duration for the fan at the condenser, and a second parameter, for example the pressure at the compressor or the temperature at the condenser. A characteristic map is a three-dimensional or multi-dimensional representation of relationships between at least three parameters. An algorithm is a calculating formula, by means of which at least one parameter can be calculated in the knowledge of another parameter. According to the invention, the control unit can advantageously be adapted to a first or to a second coolant by selecting one of the two characteristic curves, characteristic maps or algorithms.

In a further embodiment of the invention, it is provided that the control unit is set up such that it can determine a coolant which is filled into the coolant circuit on the basis of stored correlations of a pressure at the compressor and of a temperature at the evaporator, in particular taking into consideration further parameters such as an ambient temperature. It is therefore ensured that the air-conditioning system can, after filling, be operated with a permitted coolant in an optimum operating state even if the coolant is different from the originally filled coolant. This can be the case in particular if, during servicing of the air-conditioning system, new coolant is filled which is not identical to the originally-filled coolant either for availability reasons or on account of changed legal regulations. A change in the coolant can occur on account of degenerative effects of the originally filled coolant or on account of a mixture of coolants, as can occur in particular during the refilling of the air-conditioning system. A selective leakage of coolant constituents can likewise lead to a change in the properties of the coolant, which can be partially or completely compensated by means of the configuration of the control unit according to the invention by virtue of the corresponding parameters or the underlying algorithms in the control unit being adapted.

In one advantageous embodiment of the invention, at least one freely programmable memory region is provided in the control unit, in which the memory region permits the storage of at least one characteristic curve and/or of a characteristic map and/or of one or more corrective factors and/or of a calculation algorithm. It is therefore possible to ensure flexible adaptation of the control unit to at least one further coolant by means of programming before or after the filling of the coolant circuit with the corresponding coolant. This ensures particularly flexible servicing of the air-conditioning system, since the latter can be adapted to coolants which were not provided at the time of production of the air-conditioning system.

In a further embodiment of the invention, it is provided that the compressor has an adjustable stroke and that the control unit is set up to adjust the compressor stroke. By means of an adjustable stroke of the compressor, it is possible to influence the compressor pressure in a simple way without it being necessary for the power supply to the compressor to be influenced and without a repeated activation and deactivation of the compressor taking place for power limitation. This is advantageous in particular in a compressor which is driven directly by an internal combustion engine, since only the internal combustion engine is acted on only with low load changes of the compressor.

In a further embodiment of the invention, it is provided that an accumulator for separating liquid and gaseous coolant is provided. The accumulator prevents coolant which has not fully evaporated from being sucked up by the compressor and leading to possible damage there.

In a further embodiment of the invention, it is provided that the control unit is connected to an adjustable pressure regulating valve which is attached to the compressor and which is provided for influencing a target temperature at the evaporator. The pressure regulating valve is provided for regulating a suction pressure target value which can be regulated in particular by activating the pressure regulating valve with a PWM (pulse width modulated) signal of the control unit. Depending on the refrigerant used, a target temperature at the evaporator correlates with the suction pressure target value; said target temperature is adjusted in particular by a PID (proportional-integral-differential) regulator, which is provided in the control unit, for the pressure regulating valve.

In a further embodiment of the invention, it is provided that a heat exchanger is arranged between an outlet connection of the condenser and an inlet connection of the compressor. This permits pre-heating of the coolant which is sucked up by the compressor and additional cooling of the coolant before it enters the expansion device. In this way, it is possible for the efficiency of the air-conditioning system to be increased in the case of certain coolants.

According to a further aspect of the invention, a method for operating an air-conditioning system is provided in which, in a rest state of the air-conditioning system, a rest pressure of a coolant and a rest temperature of the coolant and/or an ambient temperature are determined. The determined values for the rest pressure and the rest temperature and/or the ambient temperature can be stored in a value table and/or fed into a control unit and serve as the basis for calculation for the determination of characteristic properties of the components of the air-conditioning system and/or of the coolant used in the air-conditioning system. The rest state of the air-conditioning system can be determined in particular by means of the engine temperature of the motor vehicle in which the air-conditioning system is installed, in which the engine temperature can be queried via a bus system and must lie below a predefinable threshold value in order to be able to carry out correct determination of the rest pressure.

In a further embodiment of the invention, it is provided that, in an operating state of the air-conditioning system, an operating pressure of a coolant and an operating temperature of the coolant and/or an ambient temperature are determined. The operating pressure and the operating temperature are likewise stored in a value table and/or fed into a control unit and serve, like the rest temperature and the rest pressure, for characterizing properties of the air-conditioning system.

In a further embodiment of the invention, it is provided that, in the operating state of the air-conditioning system, a cooling power of a cooling device which is provided for cooling a condenser is adjusted by a control unit, and the operating pressure of the coolant is determined as a function of the adjusted cooling power. It is preferable for the cooling power of the cooling device, which can be embodied for example as a fan assigned to the condenser, to be increased continuously or in a stepped fashion from a minimum cooling power to a maximum cooling power, and for the operating pressure of the coolant to be determined in a continuous or stepped measurement. The determined value pairs (operating pressure correlates with cooling power) are stored in a value table.

In a further embodiment of the invention, it is provided that a ventilation device for discharging a refrigerating power provided by an evaporator is adjusted by the control unit to an in particular minimum air mass flow, and the operating pressure of the coolant is determined as a function of the adjusted air mass flow. The ventilation device determines, from the air mass flow and as a function of the temperature of the supplied air, how much energy is provided at the evaporator for evaporating the coolant. While only little energy is provided at the evaporator for evaporating the coolant at a low air temperature (in particular a low cabin temperature of the vehicle fitted with the air-conditioning system) and a minimum air mass flow, a high energy quantity is provided at the evaporator at a high air temperature and a maximum air mass flow. With the knowledge in each case of the present temperature of the air supplied by the ventilation device, it is possible, when the air mass flow is likewise known, to determine a threshold above which the operating pressure of the coolant no longer decreases even if the cooling power of the cooling device which serves for cooling the condenser is further increased. The value range of the cooling power supplied to the cooling device, the air mass flow and the air temperature at the evaporator and the minimum refrigerant pressure which is generated are stored in a value table and/or fed into a control unit. The ventilation device can in particular be a fan which serves for circulating air in a cabin of the motor vehicle and/or for providing fresh air into the cabin of the motor vehicle.

In a further embodiment of the invention, it is provided that the rest pressure of the coolant, the operating pressure of the coolant, which is determined in particular as a function of the cooling power of a cooling device and/or as a function of the air mass flow of the ventilation device, the operating temperature of the coolant and/or the ambient temperature are provided to the control unit in order to determine at least one characteristic curve of the coolant, in particular a vapor pressure curve of the coolant. The characteristic curve can take place at every re-start of the motor vehicle which is fitted with the air-conditioning system or at random or predefined intervals, and serves for measuring changes in the properties of the coolant. Property changes of said type can occur if highly volatile constituents of the coolant volatilize, if a second coolant is added to a first coolant during the course of servicing work, or if constituents of the coolant vary, for example break down, over the course of time. By taking into consideration the varying properties of the coolant, it is possible for an advantageous adaptation of the operation of the air-conditioning system to take place in order to obtain a maximum cooling power with minimum energy input within the context of the present boundary conditions. In one advantageous embodiment of the invention, it is possible for a diagnosis of the cooling capacity in each case of the present coolant composition to be carried out on the basis of the characteristic curve of the coolant and, if a minimum cooling capacity is undershot, to indicate this to the user of the air-conditioning system.

In a further embodiment of the invention, it is provided that the control unit carries out an adjustment of a suction pressure and/or of an evaporator temperature by influencing a the power of a compressor, in particular by influencing an activation duration of the compressor or by activating a pressure regulating valve which is assigned to the compressor, as a function of the determined characteristic curve of the coolant. Energy-efficient operation of the air-conditioning system as a function of the composition of the coolant is therefore ensured.

BRIEF DESCRIPTION OF THE SEVERAL VIEWS OF THE DRAWINGS

The invention is, by way of an example, explained in more detail below on the basis of the figures, in which.

DETAILED DESCRIPTION OF THE PREFERRED EMBODIMENT

Figure 1:
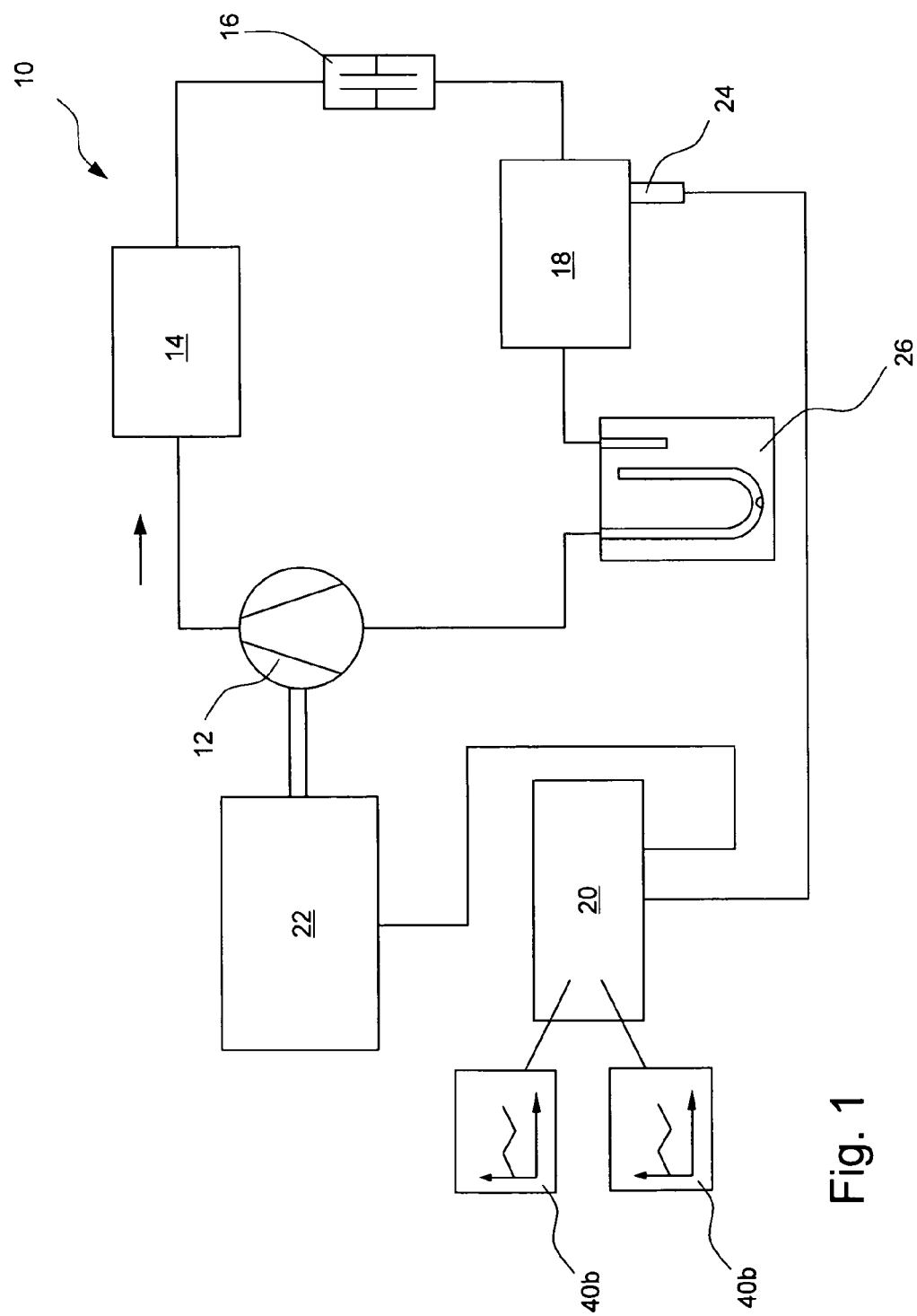
FIG. 1 shows a schematic illustration of a first embodiment of the invention with an electrically driven compressor with a fixed stroke.
Figure 2:
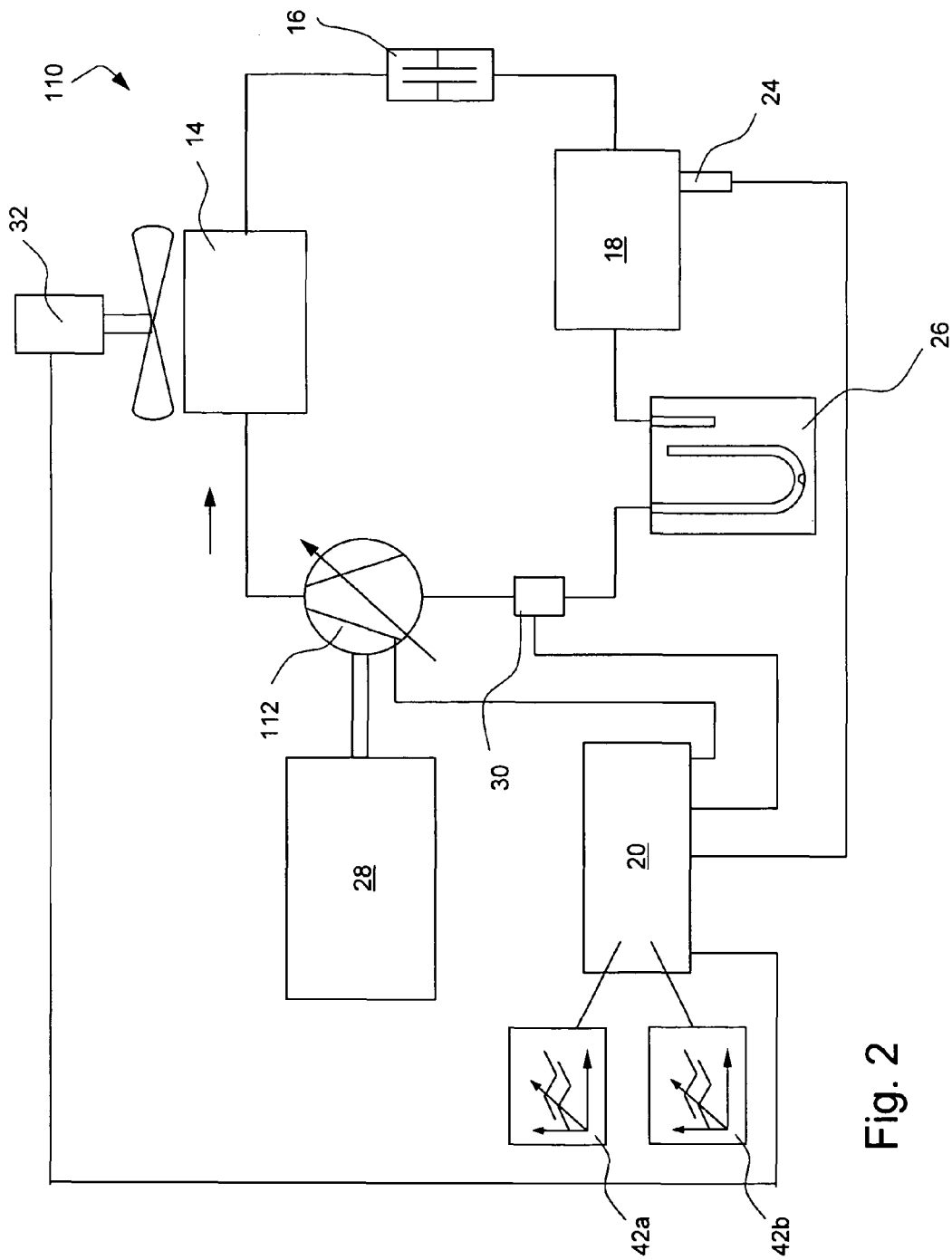
FIG. 2 shows a schematic illustration of a second embodiment of the invention with a compressor which is driven directly by the internal combustion engine and which has a variable stroke.
Figure 3:
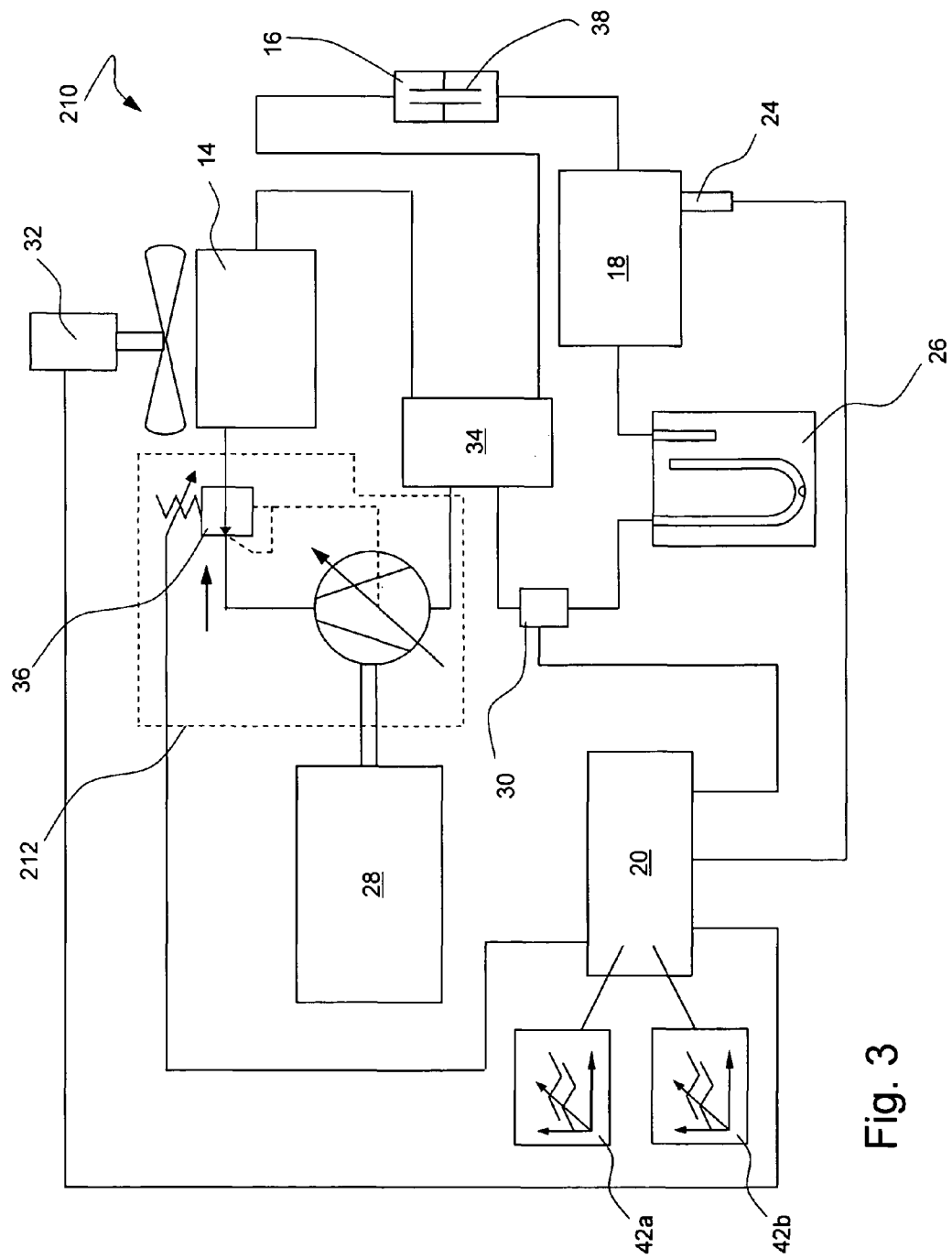
FIG. 3 shows a schematic illustration of a third embodiment of the invention with an exchangeable throttle capillary and an additional heat exchanger between the condenser outlet and compressor inlet.

In the embodiments of FIGS. 1, 2 and 3, the same reference symbols are used for functionally identical components.

An air-conditioning system 10 for a motor vehicle has a coolant circuit with a compressor 12 for compressing the coolant; a condenser 14 for cooling the compressed coolant; an expansion device 16, which is embodied as a throttle capillary, for reducing the pressure of the coolant and an evaporator 18 for evaporating the coolant. Also assigned to the coolant circuit is a control unit 20 which is connected to an electric motor 22 which is provided for driving the compressor 12. The control unit 20 is also connected to a temperature sensor 24 which is attached to the evaporator 18 and which provides a temperature signal which is proportional to the temperature at the evaporator 18.

The compressor 12 has a fixed, non-adjustable stroke, so that an adaptation of the coolant pressure in the coolant circuit must be obtained by means of a cyclical or non-cyclical compression of coolant. Since no pressure sensor for the coolant is provided in the illustrated embodiment, the coolant pressure which is to be provided by the compressor 12 is determined on the basis of the temperature sensor 24 on the evaporator 18 using one of at least two coolant-dependent characteristic curves 40a, 40b which are stored in the control unit 20 and which are assigned to the control unit 20 schematically as graphs. From the characteristic curve 40a, 40b, it is also possible by means of a calculation algorithm stored in the control unit 20 to derive the power supply and/or activation duration of the electric motor 22 with which the desired coolant pressure can be obtained.

In an embodiment of the invention which is not illustrated, the compressor is coupled by means of a switchable clutch and a V-belt to the crankshaft of an internal combustion engine. The switchable clutch is activated by the control unit and permits activation or deactivation of the compressor on demand for regulating a mean compressor power.

During the operation of the compressor 12, the coolant is compressed, with said coolant also being heated by the energy supply which takes place during the compression. A part of the supplied heat is dissipated from the coolant in the condenser 14 which serves as a heat exchanger with the ambient air, so that said coolant now has a high pressure and a reduced energy content and passes into the liquid state of aggregation. The throttle capillary 16 which is arranged downstream of the condenser 14 is substantially adapted with regard to its internal diameter and its length to the properties of the coolant used, so that said throttle capillary 16 constitutes a predefinable flow resistance for the liquid coolant. Since the compressor 12 can feed more coolant than can flow through the throttle capillary 16, a coolant-dependent pressure is built up between the compressor 12 and the throttle capillary 16. The coolant-dependent pressure is determined in particular by the vapor pressure of the coolant and by its viscosity in the liquid state, and is stored in the corresponding characteristic curve 40a, 40b in the control unit 20.

The coolant which flows through the throttle capillary 16 enters into a region of low pressure and is hereby expanded. As a result of the expansion and the heat supply at the evaporator 18, the coolant passes—at least substantially—from the liquid into the gaseous state of aggregation, with a considerable energy quantity being required for vaporization. Said energy quantity is extracted from the ambient air in the region of the evaporator 18, the air is thereby cooled and can be supplied to an interior space (not illustrated) of a motor vehicle. The coolant, which is now substantially gaseous, flows through an accumulator 26 in order to separate out any liquid constituents which may be present, and is subsequently supplied back to the compressor 12 in order to be compressed and liquefied again.

On the basis of the temperature sensor 24 which is attached to the evaporator 18, and taking into consideration the two coolant-dependent characteristic curves 40a, 40b, it is possible for the control unit 20 to draw conclusions regarding what the present cooling demand is and whether or not the compressor 12 must compress further coolant.

The embodiment of the air-conditioning system 110 as per FIG. 2 differs from the embodiment as per FIG. 1 in that the internal combustion engine 28 of a motor vehicle (not illustrated in any more detail) is used to drive the compressor 112 which is embodied as an adjustable compressor 112 with a stroke which can be adjusted externally by means of the control unit 20 and an actuating device (not illustrated in any more detail), and which thereby makes it possible to influence the coolant pressure prevailing in the coolant circuit. The control unit 20 is connected to a pressure sensor 30 which is arranged in the coolant circuit between the accumulator 26 and the compressor 112 and which makes it possible to determine the pressure of the gaseous coolant.

In an embodiment of the invention which is not illustrated, in addition or alternatively to the pressure sensor arranged between the accumulator and the compressor, a pressure sensor is arranged at the high-pressure side at the outlet of the compressor or downstream of the condenser.

The control unit 20 is also connected to a fan 32 which is assigned to the condenser 14 in order to bring about an improved exchange of heat of the condenser 14 with the ambient air. Respectively assigned multi-dimensional characteristic maps 42a, 42b for a plurality of coolants are stored in the control unit 20, in which characteristic maps 42a, 42b are defined relationships between the pressure of the coolant at the pressure sensor 30, the temperature at the evaporator 18 and the coolant pressure which is to be provided by the compressor 112 and the air flow, which is to be provided by the fan 32, for cooling the condenser 14. The characteristic maps 42a, 42b therefore define signal levels which are required for the activation of the adjustable compressor 112 and of the fan 32 in order to ensure efficient operation of the air-conditioning system 110.

In the embodiment of the air-conditioning system 210 as per FIG. 3, in addition to the components as per FIG. 2, a heat exchanger 34 is provided which permits a heat flow between the outlet connection of the condenser 14 and the inlet connection of the compressor 212. A pressure regulating valve 36 which is connected downstream of the compressor 212 and which can be activated by the control unit 20 regulates the pressure of the coolant compressed by the compressor 212, and therefore also the suction pressure of the coolant sucked up by the compressor 212, by virtue of the stroke of the adjustable compressor 212 being adjusted. This takes place by means of the control unit 20 specifying a pressure value to the pressure regulating valve 36, which itself influences the compressor 212 via a control line.

Since there is a correlation between the suction pressure and the temperature at the evaporator 18, it is possible to carry out an adjustment of the evaporator temperature by adjusting the pressure regulating valve 36 as a function of the coolant used.

The throttle tube 38 which is used in the throttle capillary 16 is designed to be exchangeable in order to be able to carry out an advantageous adaptation to different coolants. A plurality of multi-dimensional characteristic maps 42a, 42b are stored in the control unit 20, in which the characteristic maps 42a, 42b, in addition to the activation of the compressor 212 and of the fan 32 as known from the embodiment of FIG. 2, also permit an activation of the pressure regulating valve 36 in order to be able to bring about favorable operation of the air-conditioning system 10.

In an embodiment of the invention which is not illustrated, in a modification to the embodiment as per FIG. 3, instead of the exchangeable throttle tube, an expansion valve is provided which can be adjusted electronically by the control unit and by means of which the throttling action can be adjusted to the requirements of the air-conditioning system. For this purpose, corresponding characteristic curves for the expansion valve are stored in the control unit, in which the characteristic curves describe a connection between the composition and the properties of the coolant and the throttling which is required in each case.

An adaptation of the air-conditioning systems 10, 110, 210 as per the embodiments of FIGS. 1 to 3 to different coolants can take place by means of a selection of a characteristic curve or characteristic map 40a, 40b, 42a, 42b or calculation algorithm which is stored in the control unit 20, for example at the end of a production process during the programming of the other control units of the motor vehicle. Alternatively, the control unit 20 can also, after the coolant circuit is filled with a coolant, be programmed with the corresponding characteristic curves, characteristic maps 40a, 40b, 42a, 42b or calculation algorithms.

In a further embodiment of the invention, it is provided that the control unit 20 carries out autonomous detection of the coolant on the basis of the temperatures and pressures which occur in the coolant circuit during operation, and subsequently uses the characteristic values provided for the corresponding coolant for the operation of the operation of the air-conditioning system.

What is claimed is:

1. An air-conditioning system for a motor vehicle, having a coolant circuit formed at least from the components:
   compressor for compressing the coolant;
   condenser for cooling the compressed coolant;
   expansion device for reducing the pressure of the coolant; and
   evaporator for evaporating the coolant, wherein
   a control unit is provided which is connected to at least one of the coolant circuit components and which is set up to adapt an operating characteristic of the coolant circuit component to at least two different coolants;
   said control unit further including a different characteristic curve or characteristic map or calculation algorithm associated with each different coolant for controlling an operating characteristic of the compressor wherein selecting one of said characteristic curves or characteristic maps or calculation algorithms associated with a different coolant adapts said control unit to said different coolant; and
   said control unit set up to monitor the temperature at the evaporator and the pressure at the compressor to determine the coolant in said coolant circuit and correspondingly use said different characteristic curve or characteristic map or calculation algorithm associated with the determined coolant to control said operating characteristic of said compressor.

2. The air-conditioning system as claimed in claim 1, wherein
   the control unit is connected to the compressor and is set up to influence a compressor pressure and/or a compressor power in a coolant-dependent fashion.

3. The air-conditioning system as claimed in claim 1, wherein
   a temperature sensor which is connected to the control unit is provided on the evaporator, and wherein the control unit is set up to influence the compressor pressure and/or the compressor power as a function of the coolant and as a function of a temperature signal of the temperature sensor.

4. The air-conditioning system as claimed in claim 1, wherein
   a pressure sensor is provided on the compressor, in particular at the suction side, and wherein the control unit is set up to influence the compressor pressure and/or the compressor power as a function of the coolant and as a function of a pressure signal of the pressure sensor.

5. The air-conditioning system as claimed in claim 1, wherein
   the expansion device has an exchangeable capillary tube which is adapted to the coolant.

6. The air-conditioning system as claimed in claim 1, wherein
   said different characteristic curves or characteristic maps or calculation algorithms controlling an operating characteristic of the compressor also control operation of a fan for the condenser as a function c of a pressure at the compressor and/or of a temperature at the evaporator.

7. A method for operating an air-conditioning system designed in particular as claimed in claim 1, wherein,
   in a rest state of the air-conditioning system, a rest pressure of a coolant and a rest temperature of the coolant and/or an ambient temperature are determined.

8. The method as claimed in claim 7, wherein,
   in an operating state of the air-conditioning system, an operating pressure of a coolant and an operating temperature of the coolant and/or an ambient temperature are determined.

9. The method as claimed in claim 8, wherein,
   in the operating state of the air-conditioning system, a cooling power of a cooling device which is provided for cooling a condenser is adjusted by a control unit, and the operating pressure of the coolant is determined as a function of the adjusted cooling power.

10. The method as claimed in claim 9, wherein
    a ventilation device for discharging a refrigerating power provided by an evaporator is adjusted by the control unit to an in particular minimum air mass flow, and the operating pressure of the coolant is determined as a function of the adjusted air mass flow.

11. The method as claimed in claim 8, wherein
    the rest pressure of the coolant, the operating pressure of the coolant, which is determined in particular as a function of the cooling power of a cooling device and/or as a function of the air mass flow of the ventilation device, the operating temperature of the coolant and/or the ambient temperature are provided to the control unit in order to determine at least one characteristic curve of the coolant, in particular a vapor pressure curve of the coolant.

12. The method as claimed in claim 11, wherein
    the control unit carries out an adjustment of a suction pressure and/or of an evaporator temperature by influencing a power of a compressor, in particular by influencing an activation duration of the compressor or by activating a pressure regulating valve which is assigned to the compressor, as a function of the determined characteristic curve of the coolant.

13. An air-conditioning system for a motor vehicle, having a coolant circuit formed at least from the components:
    compressor for compressing the coolant;
    condenser for cooling the compressed coolant;
    expansion device for reducing the pressure of the coolant; and
    evaporator for evaporating the coolant, wherein
    a control unit is provided which is connected to at least one of the coolant circuit components and which is set up to adapt an operating characteristic of the coolant circuit component to at least two different coolants; and the control unit is set up such that it can determine a coolant which is filled into the coolant circuit on the basis of stored correlations of a pressure at the compressor and of a temperature at the evaporator, in particular taking into consideration an ambient temperature.

14. The air-conditioning system as claimed in claim 13, wherein
the compressor has an adjustable stroke and in that the control unit is set up to adjust the compressor stroke.

15. The air-conditioning system as claimed in claim 13, wherein
an accumulator for separating liquid and gaseous coolant is provided.

16. The air-conditioning system as claimed in claim 13, wherein
the control unit is connected to an adjustable pressure regulating valve which is attached to the compressor and which is provided for influencing a target temperature at the evaporator.

17. The air-conditioning system as claimed in claim 13, wherein
a heat exchanger is arranged between an outlet connection of the condenser and an inlet connection of the compressor.

* * * * *